(12) United States Patent
Heo et al.

(10) Patent No.: US 12,358,609 B2
(45) Date of Patent: Jul. 15, 2025

(54) CONTROL SYSTEM FOR OPERATING AIR VEHICLE FOR URBAN AIR MOBILITY

(71) Applicants: Hyundai Motor Company, Seoul (KR); Kia Corporation, Seoul (KR)

(72) Inventors: Jin Hyuck Heo, Seoul (KR); Kyu Won Kim, Seoul (KR); Min Woo Han, Gyeonggi-do (KR); Jong Ho Lee, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 717 days.

(21) Appl. No.: 17/516,168

(22) Filed: Nov. 1, 2021

(65) Prior Publication Data

US 2022/0324550 A1 Oct. 13, 2022

(30) Foreign Application Priority Data

Apr. 12, 2021 (KR) .................... 10-2021-0046857

(51) Int. Cl.
*B64C 13/10* (2006.01)
*B64C 13/04* (2006.01)
*B64C 13/50* (2006.01)
*B64U 10/14* (2023.01)

(52) U.S. Cl.
CPC .......... *B64C 13/10* (2013.01); *B64C 13/0423* (2018.01); *B64C 13/044* (2018.01); *B64C 13/503* (2013.01); *B64C 13/507* (2018.01); *B64U 10/14* (2023.01); *B64U 2201/20* (2023.01)

(58) Field of Classification Search
CPC ... B64C 13/0423; B64C 13/044; B64C 13/10; B64C 13/345; B64C 13/46; B64C 13/507
See application file for complete search history.

(56) References Cited

U.S. PATENT DOCUMENTS

| | | | | |
|---|---|---|---|---|
| 7,750,593 | B2* | 7/2010 | Tillotson | B64C 13/507 345/161 |
| 8,002,220 | B2* | 8/2011 | Wilkens | B64C 13/507 244/223 |
| 10,556,668 | B2* | 2/2020 | Grohmann | B64C 13/044 |
| 10,967,953 | B2* | 4/2021 | Zierten | B64C 13/507 |
| 11,148,785 | B2* | 10/2021 | Ahmad | B64C 13/507 |
| 2020/0233409 | A1* | 7/2020 | Scaini | B64U 10/14 |
| 2022/0153072 | A1* | 5/2022 | de Roos | B64C 13/044 |

FOREIGN PATENT DOCUMENTS

| | | | | |
|---|---|---|---|---|
| DE | 102014108661 B3 | * 10/2015 | ............ | B60W 50/12 |
| EP | 3922550 A1 | * 12/2021 | ........... | B64C 13/042 |

* cited by examiner

*Primary Examiner* — Richard Green
(74) *Attorney, Agent, or Firm* — Fox Rothschild LLP

(57) ABSTRACT

A control system for operating an air vehicle for urban air mobility (UAM) is arranged such that when a steering operation for a steering wheel and a stroke operation for an accelerator pedal and a brake pedal are performed for operating the air vehicle for UAM, haptic feedback providing notification of any operational limitations is provided to a driver, so that operation stability and convenience of the driver are secured and stable steering, acceleration, and deceleration of the air vehicle are performed.

9 Claims, 15 Drawing Sheets

CONTROL SYSTEM FOR OPERATING AIR VEHICLE FOR URBAN AIR MOBILITY

CROSS REFERENCE TO RELATED APPLICATION

The present application claims under 35 U.S.C. § 119(a) the benefit of Korean Patent Application No. 10-2021-0046857, filed Apr. 12, 2021, the entire contents of which are incorporated by reference herein.

BACKGROUND

(a) Technical Field

The present disclosure relates generally to a control system for operating an air vehicle for urban air mobility (UAM), more particularly, to the control system capable of providing haptic feedback to a driver operating a steering wheel, an accelerator pedal, and a brake pedal, thereby enabling the driver to achieve stable operation of the air vehicle.

(b) Description of the Related Art

Recently, urban air mobility (UAM) for a proposed transportation system envisioned for the future is being researched and developed, and an area of particular focus for research and development includes a vertical take-off and landing (VTOL) air vehicle.

One type of VTOL air vehicle is a drone-type VTOL air vehicle having multiple rotors for improved degree of freedom in flight and capable of taking off and landing in a narrow space.

For example, the drone-type VTOL air vehicle having multiple rotors typically includes a quadcopter drone or a quadrotor drone having at least four rotors, and the quadcopter drone or the quadrotor drone may be utilized for UAM.

The flight principle of the drone-type VTOL air vehicle having at least four rotors will be described with reference to FIGS. 1 to 5 (RELATED ART).

The VTOL air vehicle typically includes four rotors, including a first rotor 10 and a second rotor 20 arranged at a front left and a front right of the air vehicle, and a third rotor 30 and a fourth rotor 40 arranged at a rear left and a rear right of the air vehicle, where the first rotor 10 and the fourth rotor 40 are arranged diagonally with respect to each other and the second rotor 20 and the third rotor 30 are arranged diagonally with respect to each other.

Referring to FIG. 1, for taking-off and landing, and during flight of the VTOL air vehicle, the first rotor 10 and the fourth rotor 40 rotate clockwise (CW) and the second rotor 20 and the third rotor 30 rotate counterclockwise (CCW), where forward and backward movements, lateral movement, etc. of the VTOL air vehicle may be performed by controlling rotational velocity and the direction of each rotor.

For example, when the VTOL air vehicle rises, as shown in FIG. 2, the first rotor 10 and the fourth rotor 40 rotate CW at high velocity, and simultaneously the second rotor 20 and the third rotor 30 rotate CCW at high velocity.

When the VTOL air vehicle moves forward, as shown in FIG. 3, the first rotor 10 and the second rotor 20 rotate at low velocity, and simultaneously the third rotor 30 and the fourth rotor 40 rotate at high velocity.

When the VTOL air vehicle turns to the right, as shown in FIG. 4, the first rotor 10 and the fourth rotor 40 rotate CW at low velocity, and simultaneously the second rotor 20 and the third rotor 30 rotate CCW at high velocity.

When the VTOL air vehicle moves to the left, as shown in FIG. 5, the first rotor 10 and the third rotor 30 rotate at low velocity, and simultaneously the second rotor 20 and the fourth rotor 40 rotate at high velocity.

In addition, forward and backward acceleration of the VTOL air vehicle is controlled by forward pitching or backward pitching of the air vehicle while adjusting the lift of the front rotors (first rotor and second rotor) or the rear rotors (third rotor and fourth rotor), lateral acceleration of the VTOL air vehicle is controlled by left roll or right roll of the air vehicle while adjusting the lift of the left rotors (first rotor and third rotor) or the right rotors (second rotor and fourth rotor), and yaw movement (turning movement) of the vertical take-off and landing air vehicle is controlled by using an airframe moment in response to a difference between velocities of the rotors that are arranged diagonally.

The drone-type vertical take-off and landing air vehicle having the multiple rotors is capable of pure lateral movement thereby greatly improving movement freedom, but a driver and passengers may experience discomfort such as motion sickness and dizziness. Moreover, the driver may have difficulty in controlling movement of the air vehicle because it is possible to fly without distinction between front, rear, left, and right directions.

For stable control of the drone-type vertical take-off and landing air vehicle for UAM having multiple rotors, like driving a conventional automobile, a control human machine interface (HMI) system including a steering wheel, an accelerator pedal, a brake pedal, etc. has been developed.

The control HMI system is a driver interface system, and has been developed in such a way that the driver of the air vehicle at a predetermined altitude can operate the air vehicle as if operating the steering wheel, the accelerator pedal, and the brake pedal of a conventional automobile.

Specifically, in developing the control HMI system, when the driver operates the steering wheel, the accelerator pedal, and the brake pedal, there is a need for a method of allowing the driver to easily recognize steering angle limitations of the steering wheel, stroke limitations of the accelerator pedal and the brake pedal, etc. in order to maintain a stable flight condition of the air vehicle.

SUMMARY

The present disclosure provides a control system for operating an air vehicle for urban air mobility (UAM), in which when a steering operation for a steering wheel and a stroke operation for an accelerator pedal and a brake pedal are performed for operating a vertical take-off and landing air vehicle for UAM, the control system provides haptic feedback informing a driver of any operational limitations thereby securing control stability and convenience of the driver and achieving stable steering acceleration, and deceleration of the air vehicle.

In order to achieve the above objective, the present disclosure provides a control system for operating an air vehicle for UAM, the control system including: an altitude designating device configured to designate flight altitude of the air vehicle for UAM; a steering wheel configured to control lateral movement of the air vehicle at the designated altitude; an accelerator pedal and a brake pedal configured to control acceleration and deceleration of the air vehicle in a longitudinal direction at the designated altitude; a steering feedback actuator configured to generate reaction torque for providing haptic feedback to the steering wheel; a pedal simulator configured to generate reaction torque for providing haptic feedback to the accelerator pedal and the brake pedal; and a controller configured to perform control to allow the steering feedback actuator to generate the reaction torque for the haptic feedback and control to allow the pedal simulator to generate the reaction torque for the haptic feedback based on preset flight information and driving information of the air vehicle.

The steering feedback actuator may include: a steering gear connected to a shaft of the steering wheel; a motor configured to generate the reaction torque for the haptic feedback; and a deceleration gear connected to an output shaft of the motor and engaged with the steering gear.

The steering wheel may include an angle sensor provided at the shaft of the steering wheel, the angle sensor being configured to detect a steering angle of the steering wheel and transmit the detected steering angle to the controller.

The pedal simulator may have a structure including an electrical actuator, the electrical actuator being connected to and operated in conjunction with the accelerator pedal and the brake pedal for controlling acceleration or deceleration and being configured to generate the reaction torque in response to a pedal input value when the accelerator pedal or the brake pedal is pressed.

The controller may include: a steering angle and lateral acceleration proportion control part configured to generate a reaction torque command for the steering feedback actuator based on information about a steering angle of the steering wheel and velocity and acceleration of the air vehicle; and a pedal haptic feedback control part configured to generate a reaction torque command for the pedal simulator based on a pedal input value and deceleration generated in response to the pedal input value.

The steering angle and lateral acceleration proportion control part may include: a first reaction torque generation map configured to determine first reaction torque based on the information about velocity and acceleration of the air vehicle; a second reaction torque generation map configured to determine second reaction torque based on the steering angle of the steering wheel and the velocity of the air vehicle; and a separate gain provided at each of output stages of the first reaction torque generation map and the second reaction torque generation map.

The pedal haptic feedback control part may include: a target reaction torque generation map configured to generate target reaction torque based on the pedal input value of the brake pedal and the deceleration of the air vehicle; and a brake stroke limiter configured to generate reaction torque for mechanical pedal stroke limitation, wherein the pedal haptic feedback control part may be configured to order reaction torque, which may be obtained by addition of the target reaction torque generated from the target reaction torque generation map and the limitation reaction torque generated from the brake stroke limiter, to the pedal simulator.

The controller may include: a roll rate proportion control part configured to generate a reaction torque command for the steering feedback actuator based on information about velocity and roll rate of the air vehicle; a yaw rate proportion control part configured to generate a reaction torque command for the steering feedback actuator based on information about velocity and yaw rate of the air vehicle; a damping control part configured to perform damping control in proportion to steering angular velocity for the steering feedback actuator; and a restoration control part configured to control a restoration velocity of the steering wheel to a predetermined level in proportion to the velocity and the steering angle of the air vehicle.

The roll rate proportion control part may include a third reaction torque generation map configured to determine reaction torque based on the information about velocity and roll rate of the air vehicle.

The yaw rate proportion control part may include a fourth reaction torque generation map configured to determine reaction torque based on the information about velocity and yaw rate of the air vehicle.

The damping control part may include a damping torque generation map configured to determine damping torque that is negative torque based on the steering angular velocity.

The restoration control part may be a restoration velocity generation map configured to determine a target restoration velocity of the steering wheel based on the velocity and the steering angle of the air vehicle.

The present disclosure provides following effects through the technical solution described above.

When the driver operates the steering wheel, the accelerator pedal, and the brake pedal within plane coordinates at a preset altitude after the air vehicle for UAM automatically ascends to the preset altitude and remains in a hovering state, allowing the driver to easily recognize the operational limitations, etc. by haptic feedback, so that the control stability and convenience of the driver can be secured and the air vehicle can maintain a stable flight condition.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
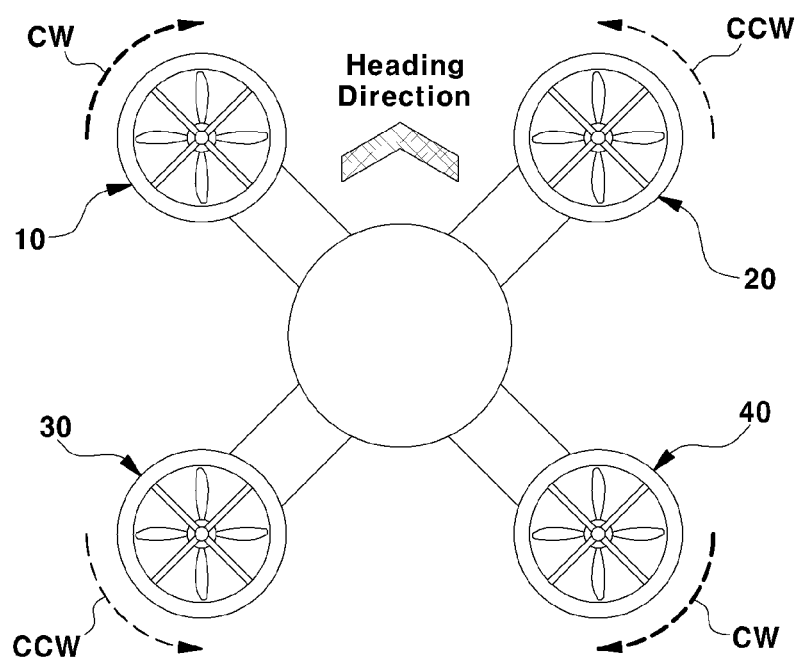
FIGS. 1 to 5 (RELATED ART) are schematic views showing a flight principle of a drone type vertical take-off and landing air vehicle having a multi-rotor.
Figure 2:
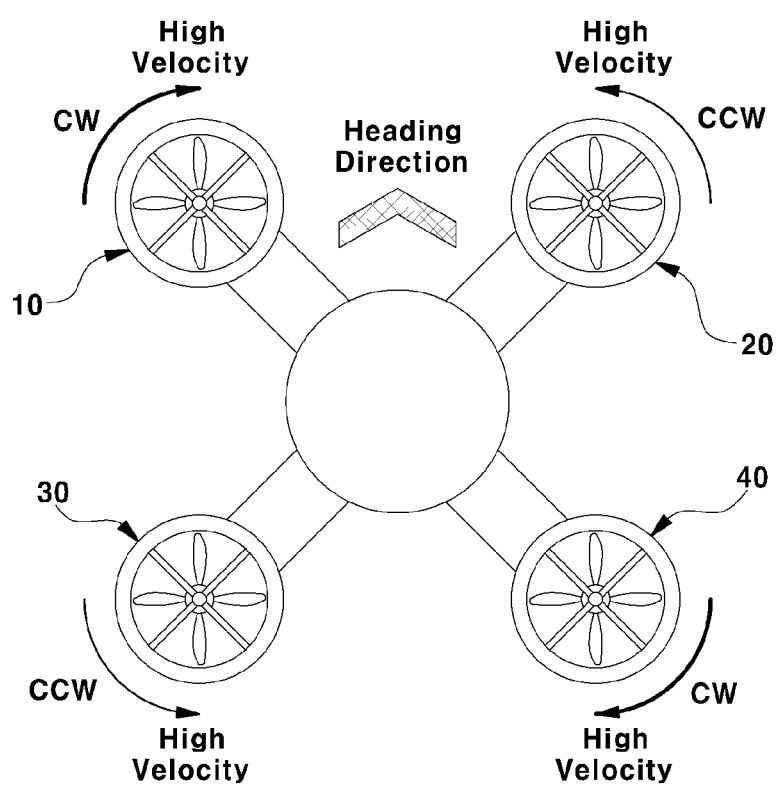
Figure 3:
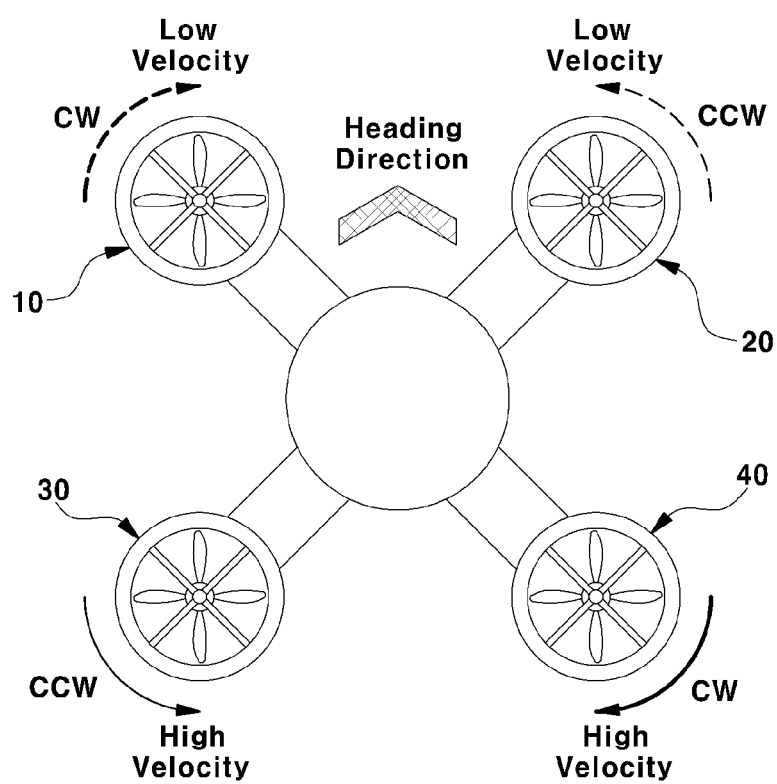
Figure 4:
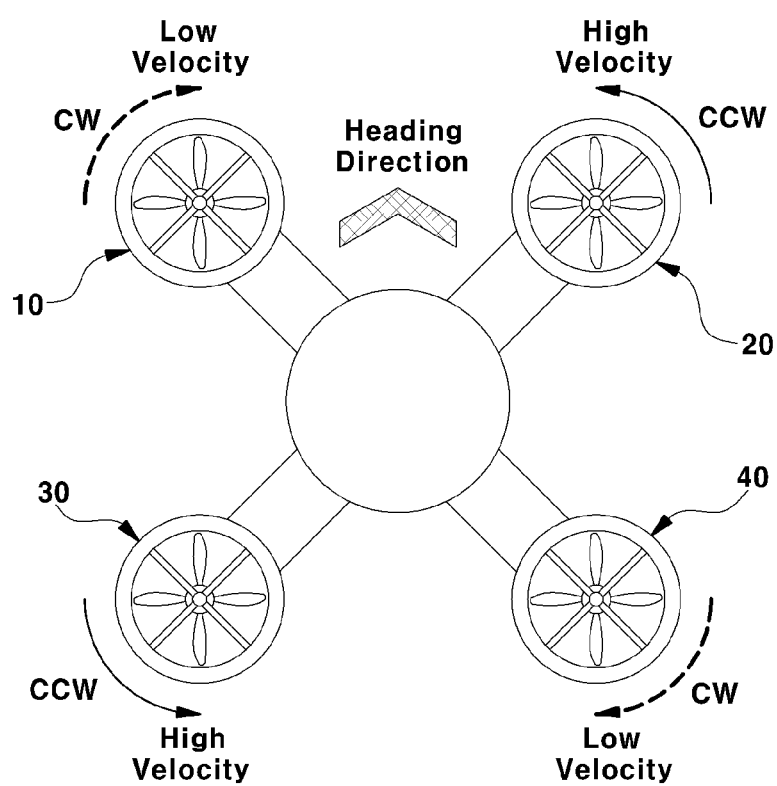
Figure 5:
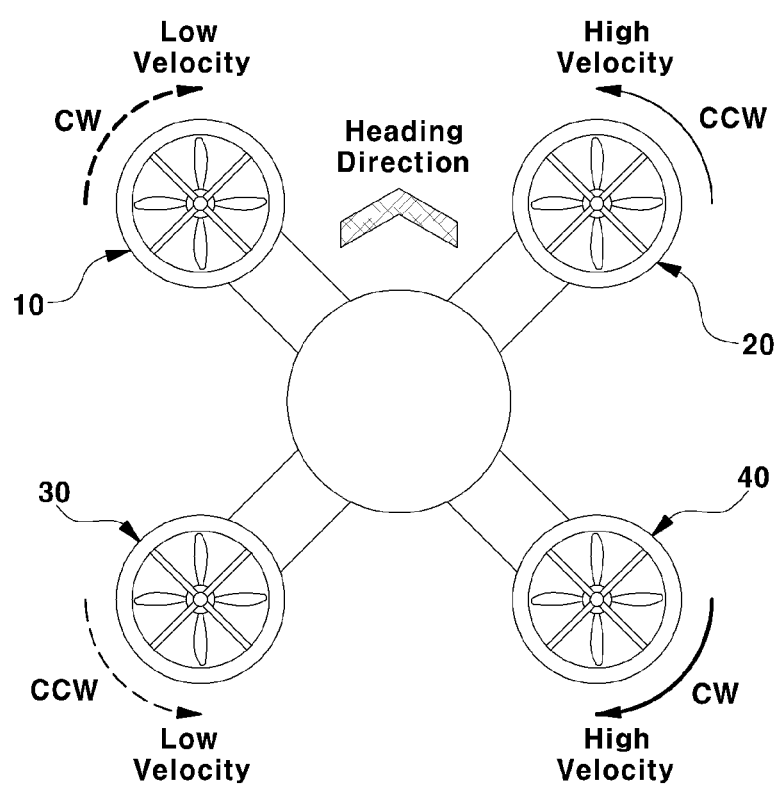

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, an exemplary embodiment of the present disclosure will be described in detail with reference to accompanying drawings.

First, to help understanding the present disclosure, the concept of a control human machine interface (HMI) system for operating an air vehicle for urban air mobility (UAM) is described, in which the system includes a steering wheel, an accelerator pedal, a brake pedal, etc.

Figure 6:
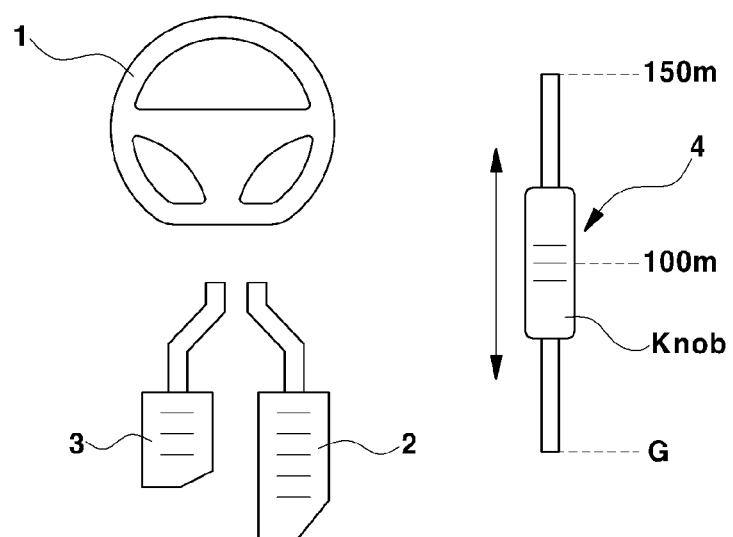
FIG. 6 is a schematic view showing a concept of a control HMI system for operating an air vehicle for urban air mobility (UAM)

As shown in FIG. 6, the control HMI system includes a steering wheel 1, an accelerator pedal 2, and a brake pedal 3 which are operated in the same manner as corresponding components used to drive a conventional automobile in addition to an altitude designating device 4 provided to designate a flight altitude of the air vehicle.

The altitude designating device 4 may be configured such that the altitude of the air vehicle is designated to a higher level when a sliding knob is operated upward, and the altitude of the air vehicle is designated to a lower level when the sliding knob is operated downward.

The steering wheel 1 is operated to allow a driver to control lateral movement of the air vehicle while the air vehicle automatically ascends to a preset altitude, and the accelerator pedal 2 and the brake pedal 3 are operated for controlling acceleration and deceleration in a longitudinal direction of the air vehicle.

The air vehicle for UAM does not need to change altitude when entering the hovering state after ascending to the preset altitude. Therefore, when the driver presets the flight altitude by using the altitude designating device 4 (e.g., 100~150 m), the air vehicle automatically ascends to the preset altitude and maintains a hovering state.

Therefore, when the air vehicle for UAM automatically ascends to the preset altitude and maintains the hovering state, the air vehicle is capable of minimum roll, pitch, and yaw movements required for turning acceleration, and deceleration, thereby performing plane movement.

Figure 7:
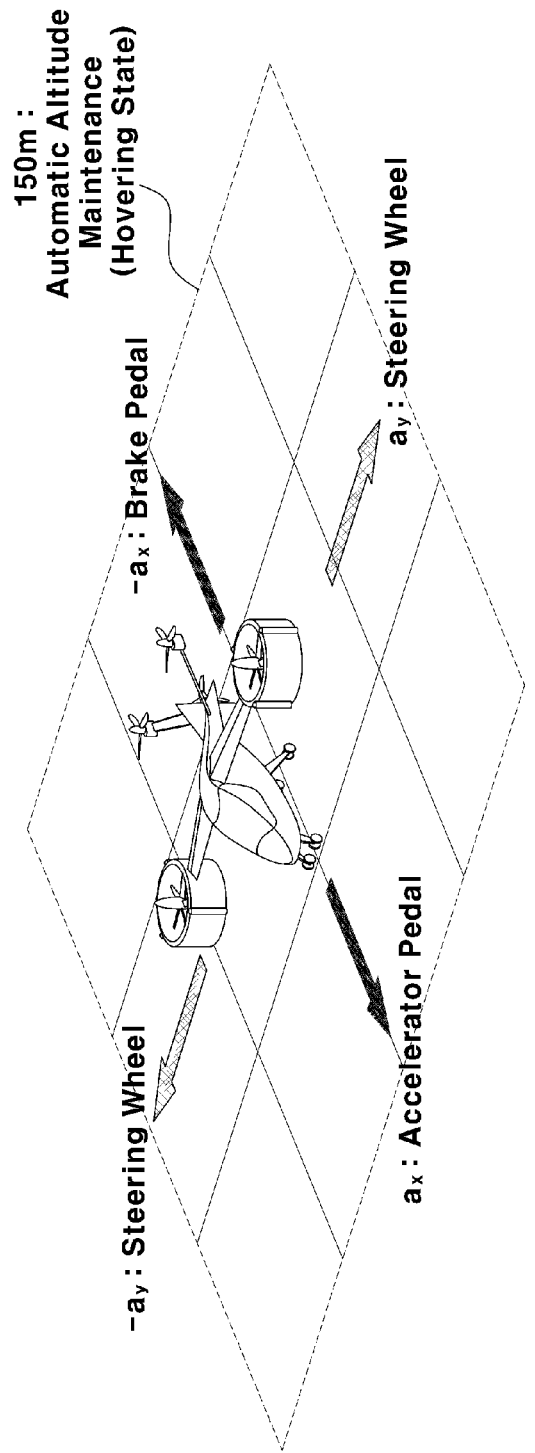
FIG. 7 is a schematic view showing that, after the air vehicle for UAM rises automatically to a preset altitude, lateral and longitudinal movements of the air vehicle are performed within plane coordinates at the preset altitude.

When the air vehicle automatically ascends to the preset altitude (e.g., 150 m) and maintains a hovering state, the lateral movement (ay) controlled by the steering wheel and the longitudinal movement (ax, −ax) controlled by the accelerator pedal and the brake pedal may be performed within plane coordinates at the preset altitude like driving a conventional automobile, as shown in FIG. 7.

In developing the control HMI system as described above, there is a demand for a method to allow the driver to easily recognize operational limitations of the steering wheel, the accelerator pedal, and the brake pedal in order to maintain a stable flight condition when the driver operates the steering wheel, the accelerator pedal, and the brake pedal.

To meet the above need, the present disclosure allows the driver to easily recognize the operational limitations by haptic feedback when the driver operates the steering wheel, the accelerator pedal, and the brake pedal provided for operating the vertical take-off and landing air vehicle for UAM.

A steering feedback actuator generating reaction torque for providing the haptic feedback is connected to the steering wheel, and a pedal simulator generating reaction torque for providing the haptic feedback is connected both to the accelerator pedal and to the brake pedal.

Figure 8:
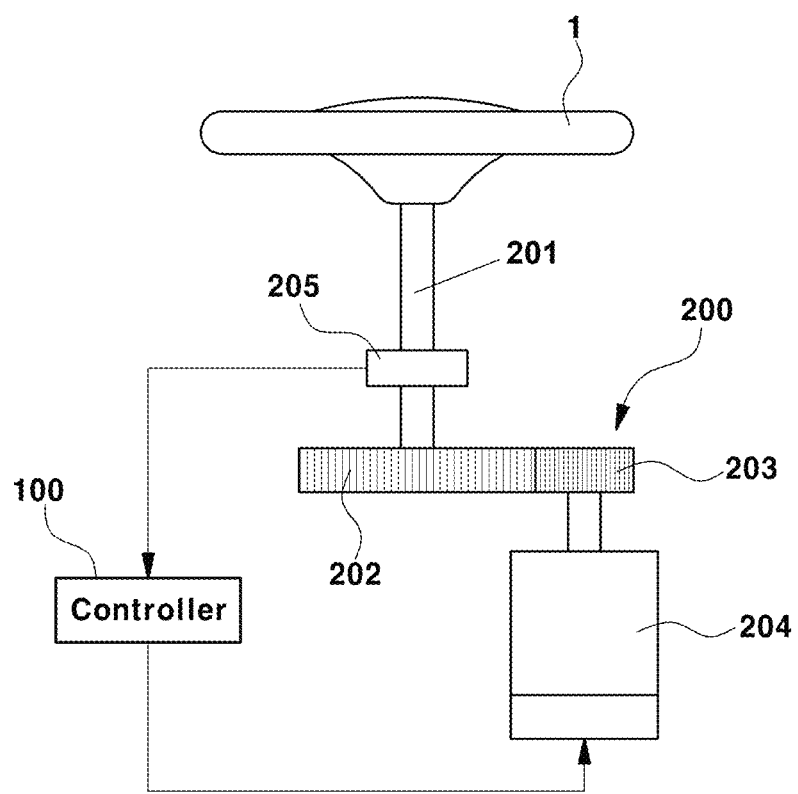
FIG. 8 is a schematic view showing a steering feedback actuator applied to the control system for operating the air vehicle for UAM according to the present disclosure.

FIG. 8 is a schematic view showing the steering feedback actuator applied to the control system for operating the air vehicle according to the present disclosure.

As shown in FIG. 8, a steering feedback actuator (SFA) 200 is configured to provide the haptic feedback in response to the reaction torque to the driver holding the steering wheel. The SFA 200 may include a steering gear 202 connected to a shaft 201 of the steering wheel 1, a motor 204 generating the reaction torque for haptic feedback, and a deceleration gear 203 connected to an output shaft of the motor 204 and engaged with the steering gear 202.

An angle sensor 205 is mounted to the shaft 201 of the steering wheel 1. The angle sensor 205 is configured to detect a steering angle of the steering wheel and to transmit the detected steering angle to a controller 100.

When the controller 100 issues a torque command for generating the reaction torque to the motor 204 based on a steering angle detection signal of the angle sensor 205, the motor 204 is driven while generating the reaction torque, whereby the driver holding the steering wheel 1 feels the haptic feedback according to the reaction torque.

Figure 9:
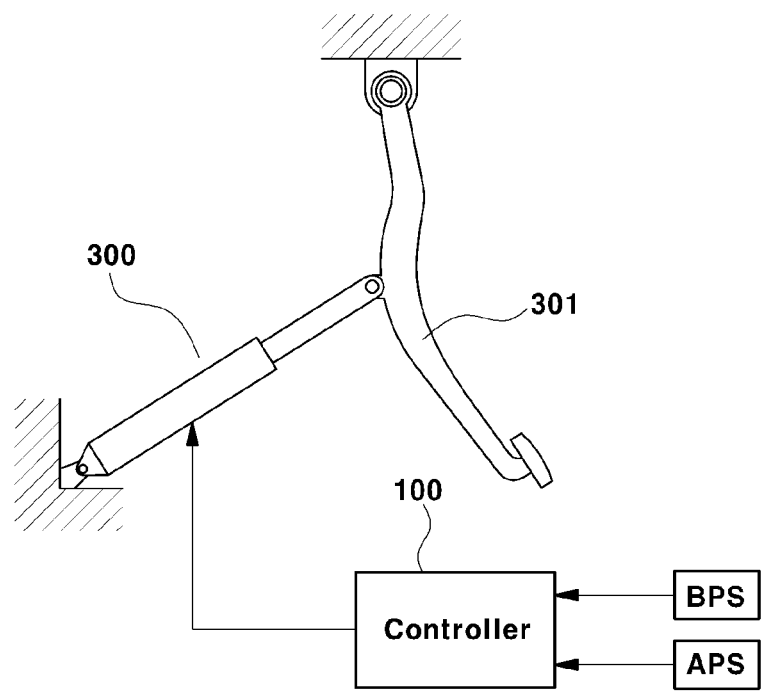
FIG. 9 is a schematic view showing a pedal simulator applied to the control system for operating the air vehicle for UAM according to the present disclosure.

FIG. 9 is a schematic view showing the pedal simulator applied to the control system for operating the air vehicle for UAM according to the present disclosure.

As shown in FIG. 9, a pedal simulator 300 is connected to a pedal 301 (i.e., an accelerator pedal or a brake pedal) provided for accelerating and decelerating and is operated in conjunction with the pedal 301, and generates the reaction torque in response to a pedal input value when the pedal is pressed. As is well known, pedal simulator 300 may be configured to include an electrical actuator, a hydraulic actuator, or the like.

The pedal input value when the pedal 301 is pressed may be detected by an accelerator position sensor (APS) in a case where the pedal 301 is the accelerator pedal, and may be detected by a brake pedal sensor (BPS) in a case where the pedal 301 is the brake pedal.

When the controller 100 issues a command for generating the reaction torque to the pedal simulator 300 based on the pedal input value detected by the APS or the BPS, the actuator in the pedal simulator is driven while generating the reaction torque, so that the driver stepping on the pedal 301 feels the haptic feedback according to the reaction torque.

Figure 10:
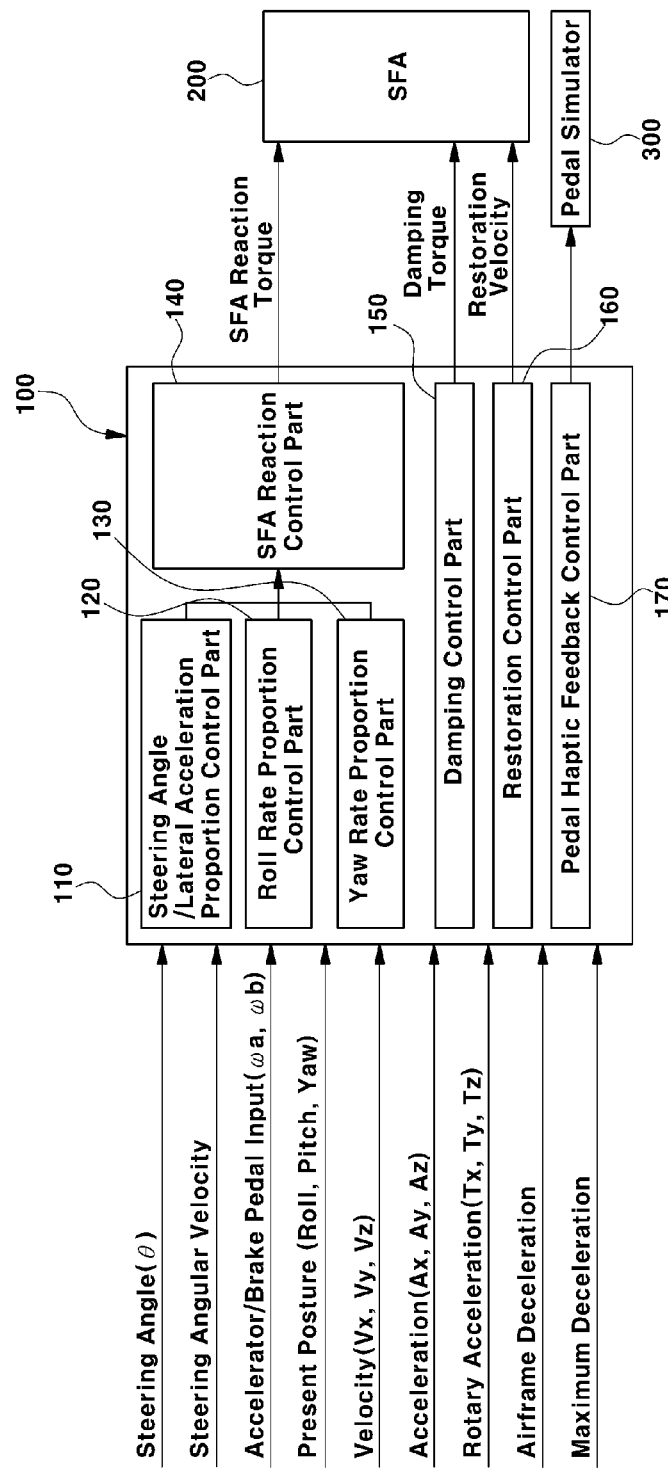
FIG. 10 is a block diagram showing the control system for operating the air vehicle for UAM according to the present disclosure.

FIG. 10 is a control block diagram showing the control system for operating the air vehicle for UAM according to the present disclosure.

As shown in FIG. 10, the controller 100 is configured to include a control logic allowing the steering feedback actuator 200 to generate the reaction torque for the haptic feedback and a control logic allowing the pedal simulator 300 to generate the reaction torque for the haptic feedback based on flight information and driving information of the air vehicle.

As shown in FIG. 10, the controller 100 includes a steering angle and lateral acceleration proportion control part 110, a roll rate proportion control part 120, a yaw rate proportion control part 130, a SFA reaction control part 140 that issues a torque command for generating the reaction torque to the steering feedback actuator 200, a damping control part 150 generating a damping torque command with respect to the steering feedback actuator 200, a restoration control part 160 generating a restoration velocity command of the steering wheel with respect to the steering feedback actuator 200, a pedal haptic feedback control part 170 generating a reaction torque command with respect to the pedal simulator 300 in order to provide the haptic feedback to the accelerator pedal or the brake pedal.

For example, the flight information and the driving information of the vertical take-off and landing air vehicle are detected by various sensors, and a steering angle (θ) and steering angular velocity of the steering wheel, a pedal input value (ωa, ωb) of the accelerator pedal and the brake pedal, a present posture of the air vehicle (roll rate, pitch value, yaw rate), velocity (Vx, Vy, Vz) of the air vehicle, acceleration (Ax, Ay, Az) of the air vehicle, rotary acceleration (Tx, Ty, Tz) of the air vehicle, a pedal input value, and deceleration and maximum deceleration of the air vehicle may be input to the controller 100.

The steering angle and lateral acceleration proportion control part 110 of the elements of the controller 100 is configured to generate a reaction torque command with respect to the steering feedback actuator 200 based on the information about a steering angle (θ) of the steering wheel, velocity (Vx, Vy, Vz) of the air vehicle, and acceleration (Ax, Ay, Az) of the air vehicle.

Figure 11:
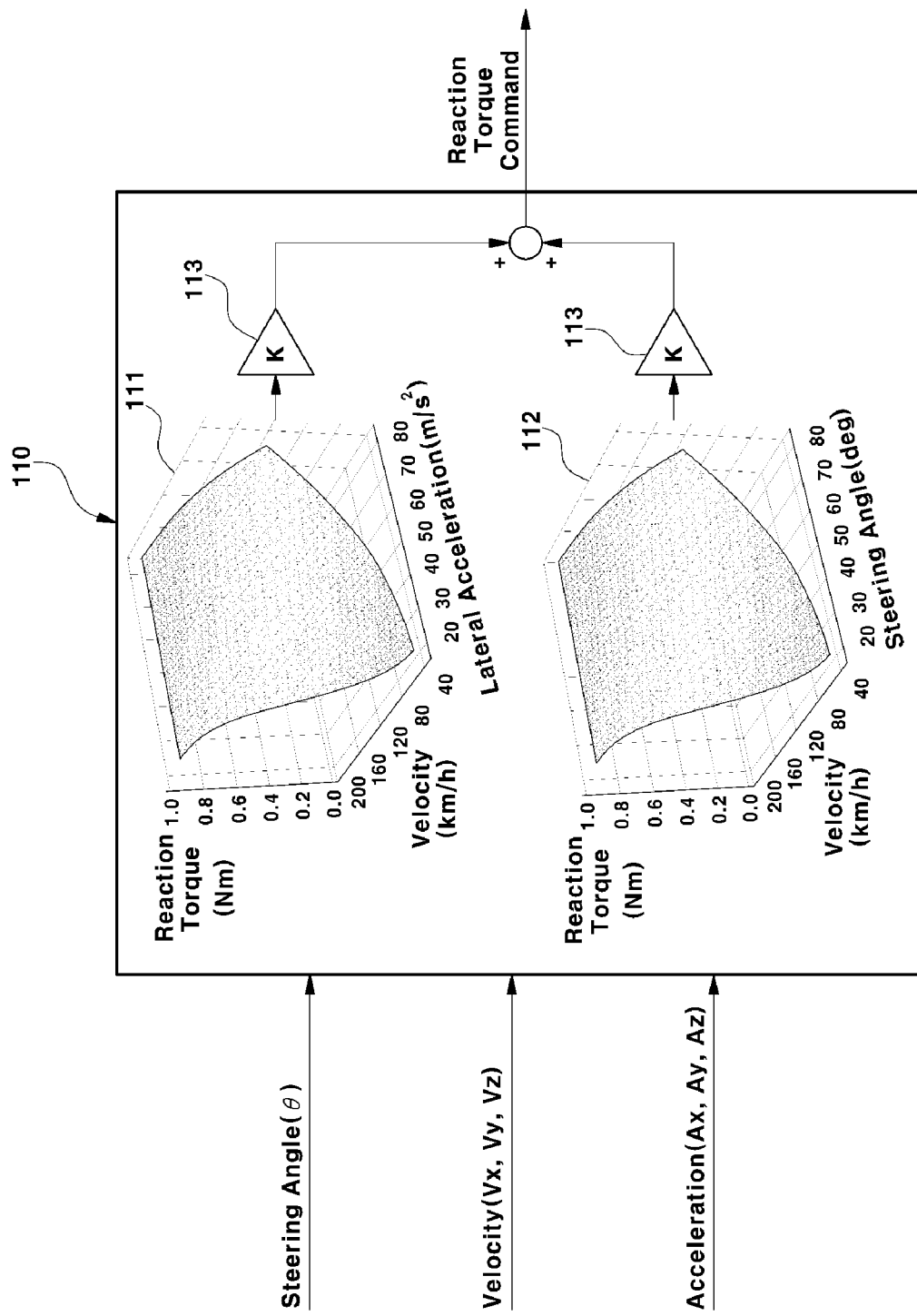
FIG. 11 is a schematic view showing a steering angle and lateral acceleration proportion control part of a controller in configuration of the control system for operating the air vehicle for UAM according to the present disclosure.

As shown in FIG. 11, the steering angle and lateral acceleration proportion control part 110 may include a first reaction torque generation map 111 determining first reaction torque based on the information about velocity (Vx, Vy, Vz) and acceleration (Ax, Ay, Az) of the air vehicle, a second reaction torque generation map 112 determining second reaction torque based on the steering angle (θ) of the steering wheel and velocity (Vx, Vy, Vz) of the air vehicle, and a separate gain 113 provided at each of output stages of the first reaction torque generation map 111 and the second reaction torque generation map 112.

Since the steering wheel is an input device controlling lateral movement of the air vehicle, lateral acceleration (Ay) in the acceleration information (Ax, Ay, Az) may be used to determine the first reaction torque as kinetic characteristics that best express the lateral movement of the air vehicle.

The first and second reaction torque generation maps 111 and 112 may be built through a test in advance, and the separate gain 113 is adopted to blend the first reaction torque determined from the first reaction torque generation map 111 and the second reaction torque determined from the second reaction torque generation map 112 to implement optimal steering feel.

Accordingly, when the air vehicle automatically ascends to the preset altitude (e.g., 150 m) and maintain the hovering state, and when the driver controls the steering wheel within the plane coordinates at the preset altitude, the lateral movement of the air vehicle may be performed.

At this point, when the driver controls the steering wheel, in order to differentiate between steering torque from on-center where a steering angle is 0 to off-center and steering torque from the off-center to a steering end stage, and to provide the haptic feedback informing that the steering wheel reaches the steering end stage to the driver, the steering angle and lateral acceleration proportion control part 110 generates the reaction torque command.

Therefore, when the angle sensor 205 mounted to the shaft 201 of the steering wheel 1 detects the steering angle of the steering wheel and transmits the detected steering angle to the controller 100, the steering angle and lateral acceleration proportion control part 110 of the controller 100 executes the logic generating the reaction torque command with respect to the steering feedback actuator 200.

In detail, following steps are performed: a step in which the first reaction torque generation map 111 of the steering angle and lateral acceleration proportion control part 110 determines the first reaction torque based on information about velocity (Vx, Vy, Vz) and acceleration (Ax, Ay, Az) of the air vehicle; a step in which the second reaction torque generation map 112 determines the second reaction torque based on a steering angle (θ) of the steering wheel and velocity (Vx, Vy, Vz) of the air vehicle; and a step in which the reaction torque command blended with the first reaction torque and the second reaction torque is issued to the motor 204 of the steering feedback actuator 200 through the SFA reaction control part 140

Next, as the motor 204 is driven while generating the reaction torque by the reaction torque issued to the motor 204, the driver holding the steering wheel 1 feels the haptic feedback according to the reaction torque, so the driver easily recognizes that the steering wheel reaches the steering end stage, thereby securing steering operation stability and convenience of the driver.

Meanwhile, the air vehicle for UAM may be changed in roll rate and yaw rate due to disturbances such as side wind, unlike the movement of a conventional automobile and, and in particular, during acceleration and deceleration of the air vehicle, yaw rate control, and lateral movement, roll movement and yaw movement of the air vehicle that are not intended by the driver may occur.

Therefore, in the configuration of the controller 100, the roll rate proportion control part 120 and the yaw rate proportion control part 130 are provided to allow the driver to easily recognize, through the haptic feedback, that unintended roll and yaw movements occur.

In the configuration of the controller 100, the roll rate proportion control part 120 is configured to generate a reaction torque with respect to the steering feedback actuator 200 based on the information about velocity (Vx, Vy, Vz), roll rate (deg/s) of the air vehicle, etc.

Figure 12:
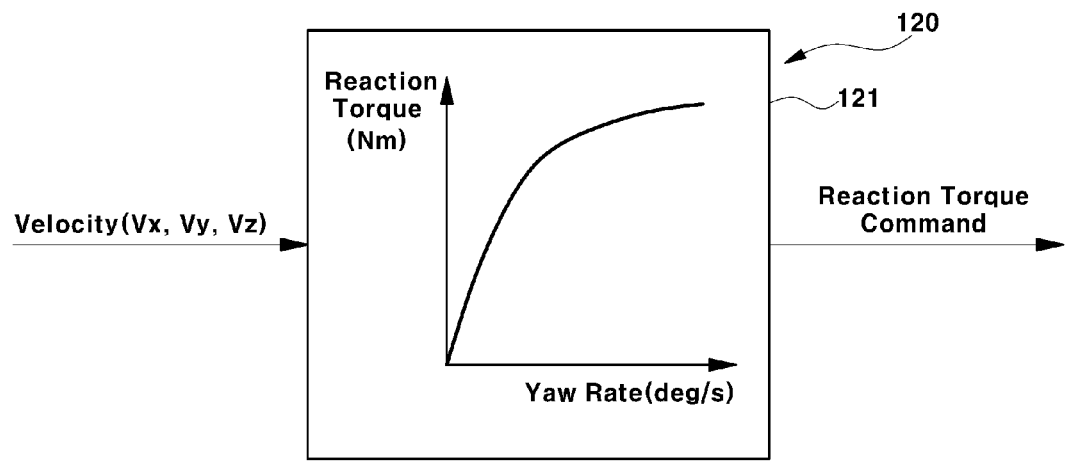
FIG. 12 is a schematic view showing a roll rate proportion control part of the controller in the configuration of the control system for operating the air vehicle for UAM according to the present disclosure.

As shown in FIG. 12, the roll rate proportion control part 120 may include a third reaction torque generation map 121 determining reaction torque based on the information about velocity (Vx, Vy, Vz), roll rate (deg/s), etc. of the air vehicle, and the third reaction torque generation map 121 may be built through a test in advance.

In the configuration of the controller 100, the yaw rate proportion control part 130 is configured to generate a reaction torque command with respect to the steering feedback actuator 200 based on the information about velocity (Vx, Vy, Vz), yaw rate (deg/s), etc. of the air vehicle.

Figure 13:
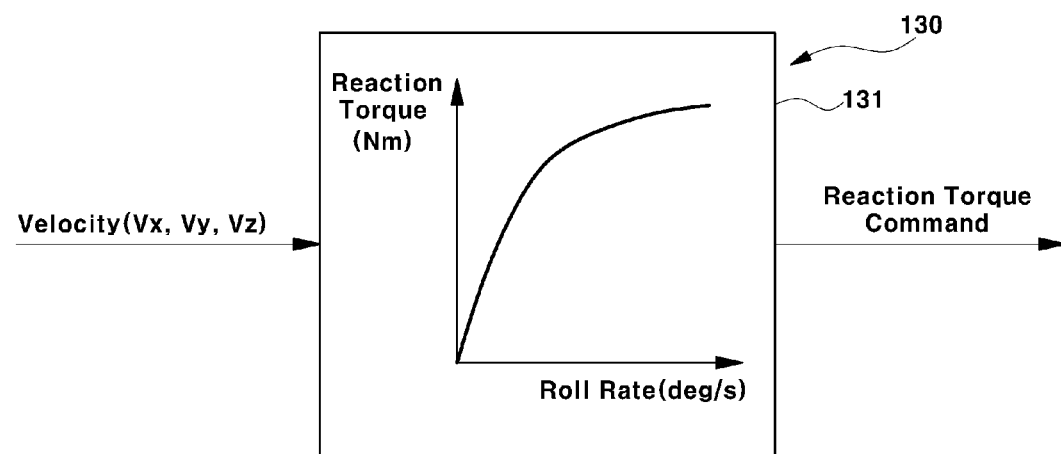
FIG. 13 is a schematic view showing a yaw rate proportion control part of the controller in the configuration of the control system for operating the air vehicle for UAM according to the present disclosure.

Therefore, as shown in FIG. 13, the yaw rate proportion control part 130 may include a fourth reaction torque generation map 131 determining reaction torque based on the information about velocity (Vx, Vy, Vz), yaw rate (deg/s) of the air vehicle, and the fourth reaction torque generation map 131 may be built through a test in advance.

Accordingly, the reaction torque command determined by the roll rate proportion control part 120 may be issued to the motor 204 of the steering feedback actuator 200 through the SFA reaction control part 140, or the reaction torque command determined by the yaw rate proportion control part 130 may be issued to the motor 204 of the steering feedback actuator 200 through the SFA reaction control part 140.

As the motor 204 is driven while generating the reaction torque by the reaction torque command issued to the motor 204, the driver holding the steering wheel 1 feels the haptic feedback in response to the reaction torque and the driver can easily recognize, through haptic feedback, that the unintended roll and yaw movements of the air vehicle occur.

Meanwhile, the reaction torque determined by the steering angle and lateral acceleration proportion control part 110 and issued to the steering feedback actuator 200 has spring feel property for the haptic feedback, and the spring feel may reduce steering feel and steering stability of the steering wheel.

To solve the above problem, the damping control part 150 in the configuration of the controller 100 is configured to perform damping control in proportion to steering angular velocity for the steering feedback actuator in order to moderate the spring feel of the steering feedback actuator and to secure the control stability against sharp steering input.

Figure 14:
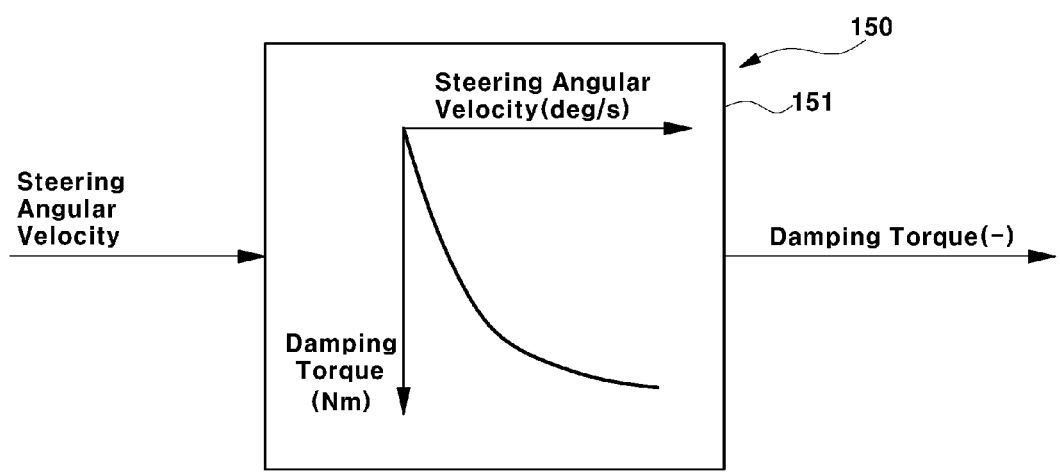
FIG. 14 is a schematic view showing a damping control part of the controller in the configuration of the control system for operating the air vehicle for UAM according to the present disclosure.

Therefore, as shown in FIG. 14, the damping control part 150 may include a damping torque generation map 151 determining damping torque (negative torque) based on the steering angular velocity, and the damping torque generation map 151 may be built through a test in advance.

Accordingly, when the damping torque command determined by the damping control part 150 is issued to the motor 204 of the steering feedback actuator 200, the motor 204 generates the damping torque that is the negative torque while being driven and generating the reaction torque, and the damping control may be performed for the sharp steering input of the steering wheel, whereby the steering stability of the steering wheel may be induced.

Meanwhile, when the driver steers the steering wheel to off-center, and then releases the steering wheel, the steering wheel should be restored to an on-center position in proportion to reduction of lateral acceleration by the reaction torque generated as described above.

However, when the reaction torque determined by the steering angle and lateral acceleration proportion control part 110 and issued to the steering feedback actuator 200 is not enough, the steering wheel may be restored to on-center too late or may not be restored to on-center, and the reaction torque is excessive, the steering wheel may be restored to on-center too early.

To solve the above problem, the restoration control part 160 in the configuration of the controller 100 is configured to control a restoration velocity of the steering wheel to a predetermined level in proportion to velocity and steering angle of the air vehicle.

Figure 15:
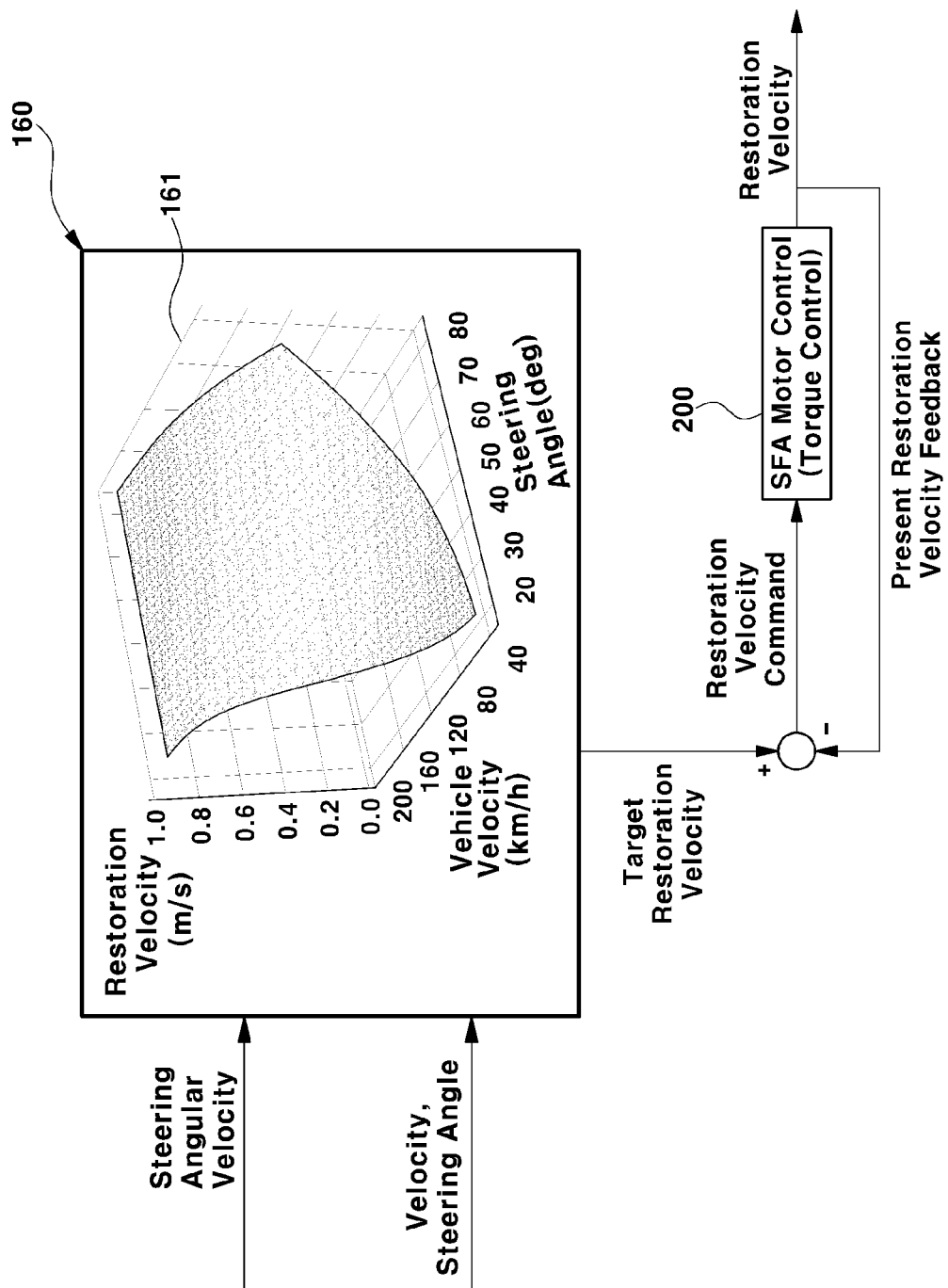
FIG. 15 is a schematic view showing a restoration control part of the controller in the configuration of the control system for operating the air vehicle for UAM according to the present disclosure.
Figure 16:
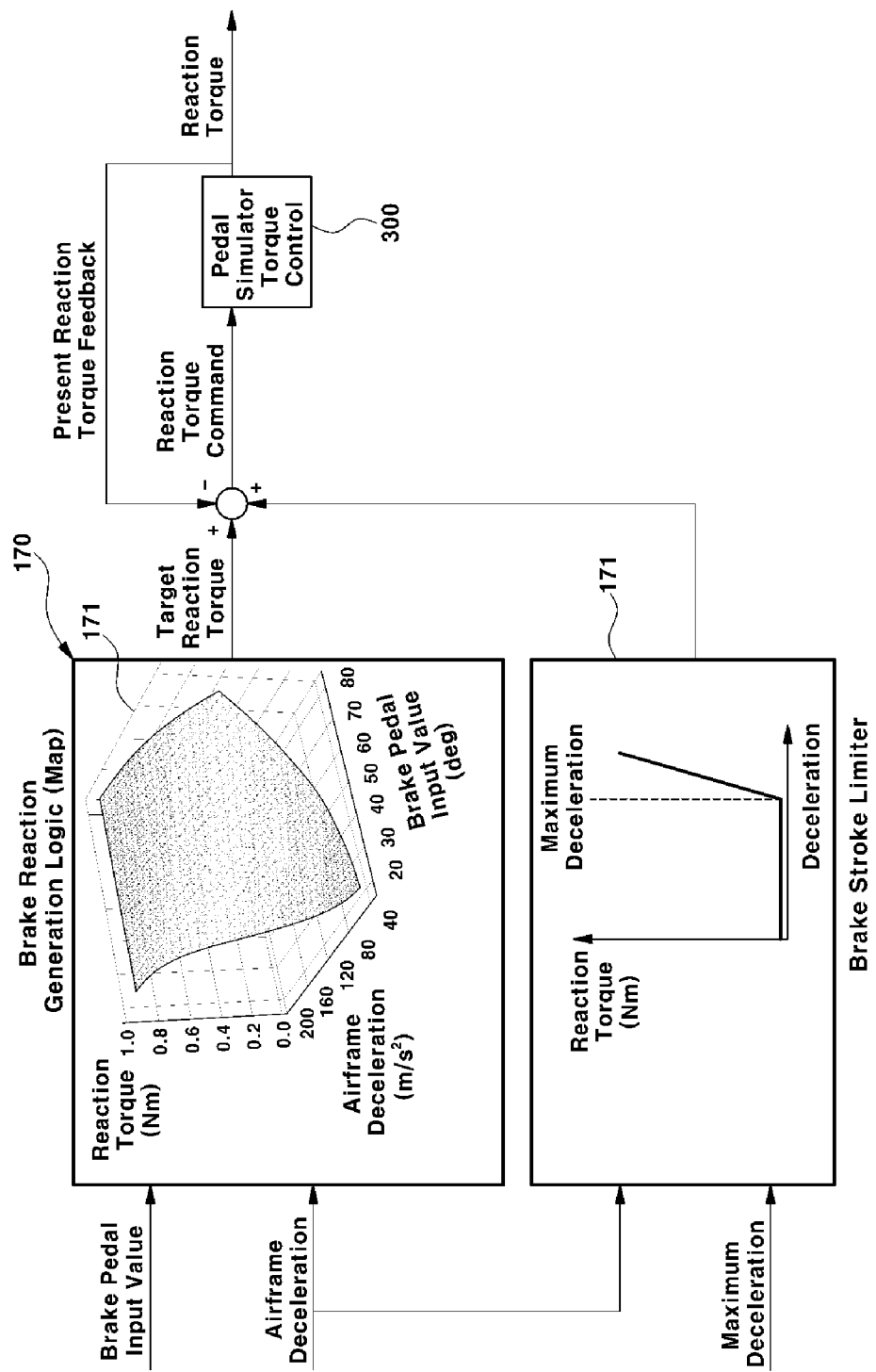
FIG. 16 is a schematic view showing a brake pedal haptic feedback control part of the controller in the configuration of the control system for operating the air vehicle for UAM according to the present disclosure.

Therefore, as shown in FIG. 15, the restoration control part 160 may include a restoration velocity generation map 161 determining a target restoration velocity (m/s) of the steering wheel based on velocity and steering angle of the air vehicle, and the restoration velocity generation map 161 may be built through a test in advance.

At this point, the present restoration velocity follows the target restoration velocity by the feedback control.

Accordingly, when the target restoration velocity determined by the restoration control part 160 is issued to the steering feedback actuator, the motor torque of the steering feedback actuator is controlled to a level implementing the target restoration velocity, so that the steering wheel may be restored to on-center at a present velocity.

Meanwhile, as the air vehicle for UAM also has properties of an airplane, maximum deceleration thereof may be finely changed in response to hydrodynamic properties according to flight altitude, temperature, and humidity, so by using only mechanical pedal stroke limitation such as the brake pedal, etc., a present deceleration limitation of the air vehicle cannot be adequately fed back to the driver.

In other words, since stroke of the brake pedal that may generates maximum deceleration of the air vehicle for UAM is changed in response to atmospheric conditions, the present deceleration limitation of the air vehicle cannot be adequately fed back to the driver using the mechanical pedal stroke limitation such as the brake pedal, etc.

To solve the above problem, the pedal haptic feedback control part 170 in the configuration of the controller 100 is configured to generate a reaction torque command for the pedal simulator 300 based on a pedal input value of the brake pedal, etc. and deceleration generated in response to the pedal input value.

The pedal haptic feedback control part 170 includes a target reaction torque generation map 171 generating the target reaction torque based on the pedal input value of the brake pedal and deceleration of the air vehicle, and a brake stroke limiter 172 generating the reaction torque for the mechanical pedal stroke limitation. The pedal haptic feedback control part 170 is configured to issue the reaction torque, to the pedal simulator, obtained by adding the target reaction torque generated from the target reaction torque generation map 171 and the reaction torque generated from the brake stroke limiter 172.

When the pedal haptic feedback control part 170 issues the reaction torque command to the pedal simulator 300, that is, when the pedal haptic feedback control part 170 issues the reaction torque obtained by adding the target reaction torque generated from the target reaction torque generation map 171 and the limiting reaction torque generated from the brake stroke limiter 172, the actuator in the pedal simulator is driven while generating the reaction torque (reaction torque of target reaction torque plus limiting reaction torque), so that the driver stepping on the pedal can easily feel the haptic feedback in response to the reaction torque.

Accordingly, even when stroke of the brake pedal capable of generating the maximum deceleration of the air vehicle for UAM is changed depending on atmospheric conditions, in addition to the limiting reaction torque generated from the brake stroke limiter 172 and meaning the mechanical pedal stroke limitation of the brake pedal, etc., the target reaction torque generated from the target reaction torque generation map 171 based on the pedal input value of the brake pedal and deceleration of the air vehicle is added, and then the actuator in the pedal simulator is driven while generating the added reaction torque, so that the driver stepping on the brake pedal can easily recognize maximum deceleration limitation of the air vehicle in response to haptic feedback according to the reaction torque, thereby the driver can achieve safe deceleration operation.

Meanwhile, in the acceleration pedal, torque control (torque control having preset inclination) is performed with respect to the actuator in the pedal simulator in linear proportion to the pedal input value (stroke), so that the driver stepping on the accelerator pedal can easily recognize that an acceleration operation is performed in response to the linear change of the reaction torque generated by the actuator.

Although the embodiment of the present disclosure has been described in detail above, the embodiment described in the specification and the configurations illustrated in the drawings is merely an example and the scope and spirit of the present disclosure are not limited to the embodiment described hereinabove. Furthermore, various modifications and improvements of those skilled in the art which uses the basic concept of the present disclosure defined by the appended claims are also included in the scope and spirit of the present disclosure.

What is claimed is:

1. A control system for operating an air vehicle for urban air mobility (UAM), the control system comprising:
    an altitude designating device configured to designate flight altitude of the air vehicle;
    a steering wheel configured to control lateral movement of the air vehicle at the designated altitude;
    an accelerator pedal and a brake pedal configured to control acceleration and deceleration of the air vehicle in a longitudinal direction at the designated altitude;
    a steering feedback actuator configured to generate reaction torque for providing haptic feedback to the steering wheel;
    a pedal simulator configured to generate reaction torque for providing haptic feedback to the accelerator pedal and the brake pedal; and
    a controller configured to perform control to allow the steering feedback actuator to generate the reaction torque for the haptic feedback to the steering wheel and control to allow the pedal simulator to generate the reaction torque for the haptic feedback to the accelerator pedal and the brake pedal based on preset flight information and driving information of the air vehicle,
    wherein the controller comprises:
        a steering angle and lateral acceleration proportion control part configured to generate a reaction torque command for the steering feedback actuator on the basis of information about a steering angle of the steering wheel and velocity and acceleration of the air vehicle;
        a pedal haptic feedback control part configured to generate a reaction torque command for the pedal simulator on the basis of a pedal input value and deceleration generated in response to the pedal input value;
        a roll rate proportion control part configured to generate a reaction torque command for the steering feedback actuator based on information about the velocity and a roll rate of the air vehicle;
        a yaw rate proportion control part configured to generate a reaction torque command for the steering feedback actuator based on information about the velocity and a yaw rate of the air vehicle;
        a damping control part configured to perform damping control in proportion to steering angular velocity for the steering feedback actuator; and
        a restoration control part configured to control a restoration velocity of the steering wheel to a predetermined level in proportion to the velocity and the steering angle of the air vehicle,
        wherein the reaction torque command generated by the roll rate proportion control part and the reaction torque command generated by the yaw rate proportion control part are issued to a motor to provide the haptic feedback to the steering wheel, and
    wherein the pedal haptic feedback control part comprises:
        a target reaction torque generation map configured to generate target reaction torque based on the pedal input value of the brake pedal and the deceleration of the air vehicle; and
        a brake stroke limiter configured to generate reaction torque for mechanical pedal stroke limitation,
        wherein the pedal haptic feedback control part is configured to order reaction torque, which is obtained by addition of the target reaction torque generated from the target reaction torque generation map and the limitation reaction torque generated from the brake stroke limiter, to the pedal simulator.

2. The control system of claim 1, wherein the steering feedback actuator comprises:
    a steering gear connected to a shaft of the steering wheel;
    the motor configured to generate the reaction torque for the haptic feedback to the steering wheel; and
    a deceleration gear connected to an output shaft of the motor and engaged with the steering gear.

3. The control system of claim 2, wherein the steering wheel comprises an angle sensor provided at the shaft of the steering wheel, the angle sensor being configured to detect a steering angle of the steering wheel and transmit the detected steering angle to the controller.

4. The control system of claim 1, wherein the pedal simulator has a structure including an electrical actuator, the electrical actuator being connected to and operated in conjunction with the accelerator pedal and the brake pedal for controlling acceleration or deceleration and being configured to generate the reaction torque in response to a pedal input value when the accelerator pedal or the brake pedal is pressed.

5. The control system of claim 1, wherein the steering angle and lateral acceleration proportion control part comprises:

a first reaction torque generation map configured to determine first reaction torque based on the information about the velocity and the acceleration of the air vehicle;

a second reaction torque generation map configured to determine second reaction torque based on the steering angle of the steering wheel and the velocity of the air vehicle; and a separate gain provided at each of output stages of the first reaction torque generation map and the second reaction torque generation map.

6. The control system of claim 1, wherein the roll rate proportion control part comprises a third reaction torque generation map configured to determine reaction torque based on the information about the velocity and the roll rate of the air vehicle.

7. The control system of claim 1, wherein the yaw rate proportion control part comprises a fourth reaction torque generation map configured to determine reaction torque based on the information about the velocity and the yaw rate of the air vehicle.

8. The control system of claim 1, wherein the damping control part comprises a damping torque generation map configured to determine damping torque that is negative torque based on the steering angular velocity.

9. The control system of claim 1, wherein the restoration control part comprises a restoration velocity generation map configured to determine a target restoration velocity of the steering wheel based on the velocity and the steering angle of the air vehicle.

* * * * *